US009355372B2

(12) United States Patent
Howald et al.

(10) Patent No.: US 9,355,372 B2
(45) Date of Patent: May 31, 2016

(54) METHOD AND SYSTEM FOR SIMPLIFYING IMPLICIT RHETORICAL RELATION PREDICTION IN LARGE SCALE ANNOTATED CORPUS

(71) Applicants: Blake Howald, Northfield, MN (US); Andrew Nystrom, Minneapolis, MN (US)

(72) Inventors: Blake Howald, Northfield, MN (US); Andrew Nystrom, Minneapolis, MN (US)

(73) Assignee: Thomson Reuters Global Resources (CH)

( * ) Notice: Subject to any disclaimer, the term of this patent is extended or adjusted under 35 U.S.C. 154(b) by 22 days.

(21) Appl. No.: 14/323,653

(22) Filed: Jul. 3, 2014

(65) Prior Publication Data
US 2015/0039294 A1    Feb. 5, 2015

Related U.S. Application Data

(60) Provisional application No. 61/842,635, filed on Jul. 3, 2013.

(51) Int. Cl.
*G06F 17/27* (2006.01)
*G06F 17/21* (2006.01)
*G06N 99/00* (2010.01)
*G06F 17/30* (2006.01)

(52) U.S. Cl.
CPC ............ *G06N 99/005* (2013.01); *G06F 17/279* (2013.01); *G06F 17/30731* (2013.01)

(58) Field of Classification Search
USPC .......................... 704/1–10, E15.022, E15.023
See application file for complete search history.

(56) References Cited

U.S. PATENT DOCUMENTS

| | | | | |
|---|---|---|---|---|
| 5,659,766 A * | 8/1997 | Saund | ................. | G06F 17/3071 704/9 |
| 6,154,737 A * | 11/2000 | Inaba | ................. | G06F 17/3069 707/696 |
| 7,295,967 B2 * | 11/2007 | Corman et al. | ................... | 704/9 |
| 7,415,445 B2 * | 8/2008 | Forman | ................ | G06K 9/6228 706/20 |
| 2001/0047254 A1 * | 11/2001 | Rising, III | ......... | G06F 17/30017 704/9 |
| 2002/0046018 A1 | 4/2002 | Marcu et al. | | |
| 2004/0044519 A1 | 3/2004 | Polanyi et al. | | |
| 2004/0059697 A1 * | 3/2004 | Forman | ................ | G06K 9/6228 706/46 |
| 2004/0243388 A1 * | 12/2004 | Corman | .............. | G06F 17/2211 704/1 |
| 2008/0294398 A1 * | 11/2008 | Qu | ........................ | G06Q 10/06 703/6 |
| 2009/0119286 A1 | 5/2009 | Reisman | | |
| 2009/0265230 A1 * | 10/2009 | Plachouras | ........ | G06Q 30/0256 705/14.54 |
| 2010/0285434 A1 | 11/2010 | Burstein et al. | | |

* cited by examiner

*Primary Examiner* — Edgar Guerra-Erazo
(74) *Attorney, Agent, or Firm* — Duncan Galloway; Egan Greenwald, PLLC; Kevin T. Duncan

(57) ABSTRACT

The present invention provides a method and system directed to predicting implicit rhetorical relations between two spans of text, e.g., in a large annotated corpus, such as the Penn Discourse Treebank ("PDTB"), Rhetorical Structure Theory corpus, and the Discourse Graph Bank, and particularly directed to determining a rhetorical relation in the absence of an explicit discourse marker. Surface level features may be used to capture pragmatic information encoded in the absent marker. In one manner a simplified feature set based only on raw text and semantic dependencies is used to improve performance for all relations. By using surface level features to predict implicit rhetorical relations for the large annotated corpus the invention approaches a theoretical maximum performance, suggesting that more data will not necessarily improve performance based on these and similarly situated features.

28 Claims, 3 Drawing Sheets

METHOD AND SYSTEM FOR SIMPLIFYING IMPLICIT RHETORICAL RELATION PREDICTION IN LARGE SCALE ANNOTATED CORPUS

CROSS REFERENCE TO RELATED APPLICATION

The present application claims benefit of priority to U.S. Prov. Pat. Application Ser. No. 61/842,635, filed Jul. 3, 2014, and entitled METHOD AND SYSTEM FOR SIMPLIFYING IMPLICIT RHETORICAL RELATION PREDICTION IN LARGE SCALE ANNOTATED CORPUS (Howald et. al.), which is hereby incorporated by reference herein in its entirety.

FIELD OF THE INVENTION

The present invention relates generally to human language/natural language processing (NLP), information retrieval and more particularly to predicting implicit rhetorical relations between spans of text within documents. Also, the invention relates to processes, software and systems for use in delivery of services related to the legal, corporate, accounting, research, educational, and other professional sectors. The invention relates to a system that presents searching functions to users, such as subscribers to a professional services related service, processes search terms and applies search syntax across document databases, and displays search results generated in response to the search function and processing.

BACKGROUND OF THE INVENTION

With the advents of the printing press, typeset, typewriting machines, computer-implemented word processing and mass data storage, the amount of information generated by mankind has risen dramatically and with an ever quickening pace. As a result there is a continuing and growing need to collect and store, identify, track, classify and catalogue for retrieval and distribution this growing sea of information. One traditional form of cataloging and classifying information, e.g., books and other writings, is the Dewey Decimal System. Increasingly, the world's economies and supporting infrastructures, including research systems, are becoming global in nature and as systems allow for cross-lingual searching information available to researchers continues to expand. A growing field of research and development is in the area of extracting relationships and other metadata about documents based on terms or patterns or discerned attributes among documents in large databases. By deriving relationship information systems can draw conclusions and connections between documents, authors, subjects and events that aid users in researching and other efforts.

In many areas and industries, including the financial and legal sectors and areas of technology, for example, there are content and enhanced experience providers, such as The Thomson Reuters Corporation. Such providers identify, collect, analyze and process key data for use in generating content, such as law related reports, articles, etc., for consumption by professionals and others involved in the respective industries, e.g., lawyers, accountants, researchers. Providers in the various sectors and industries continually look for products and services to provide subscribers, clients and other customers and for ways to distinguish their firms over the competition. Such provides strive to create and provide enhance tools, including search and ranking tools, to enable clients to more efficiently and effectively process information and make informed decisions.

For example, with advancements in technology and sophisticated approaches to searching across vast amounts of data and documents, e.g., database of legal documents or records, published articles or papers, etc., professionals and other users increasingly rely on mathematical models and algorithms in making professional and business determinations. Existing methods for applying search terms across large databases of documents have room for considerable improvement as they frequently do not adequately focus on the key information of interest to yield a focused and well ranked set of documents to most closely match the expressed searching terms and data. Although such computer-based systems have shortcomings, there has been significant advancement over searching, identifying, filtering and grouping documents by hand, which is prohibitively time-intensive, costly, inefficient, and inconsistent.

Search engines are used to retrieve documents in response to user defined queries or search terms. To this end, search engines may compare the frequency of terms that appear in one document against the frequency of those terms as they appear in other documents within a database or network of databases. This aids the search engine in determining respective "importance" of the different terms within the document, and thus determining the best matching documents to the given query. One method for comparing terms appearing in a document against a collection of documents is called Term Frequency-Inverse Document Frequency (TFIDF or TF-IDF). In this method a percentage of term count as compared to all terms within a subject document is assigned (as a numerator) and that is divided by the logarithm of the percentage of documents in which that term appears in a corpus (as the denominator). More specifically, TFIDF assigns a weight as a statistical measure used to evaluate tile importance of a word to a document in a collection of documents or corpus. The relative "importance" of the word increases proportionally to the number of times or "frequency" such word appears in the document. The importance is offset or compared against the frequency of that word appearing in documents comprising the corpus. TFIDF is expressed as the $\log(N/n(q))$ where q is the query term, N is the number of documents in the collection and $N(q)$ is the number of documents containing q. TFIDF and variations of this weighting scheme are typically used by search engines, such as Google, as a way to score and rank a document's relevance given a user query. Generally for each term included in a user query, the document may be ranked in relevance based on summing the scores associated with each term. The documents responsive to the user query may be ranked and presented to the user based on relevancy as well as other determining factors.

With regards to training an SVM, Published Pat. App. US2007/0282766 (Hartman et al.) entitled Training a Support Vector Machine With Process Constraints, which is hereby incorporated herein in the entirety, describes a system and method for training a support vector machine (SVM) and particularly a model (primal or dual formulation) implemented with an SVM and representing a plant or process with one or more known attributes. Process constraints that correspond to the known attributes are specified, and the model trained subject to the one or more process constraints. The model includes one or more inputs and one or more outputs, as well as one or more gains, each a respective partial derivative of an output with respect to a respective input. In the manner described, the trained model may be used to control or manage the plant or process.

More particularly in NLP pursuits, the rhetorical relations that hold between clauses in discourse 1) minimally index temporal and event information, and 2) contribute to a discourse's pragmatic coherence (Andrew Kehler, *Coherence, Reference, and the Theory of Grammar*, CSLI Publications, Stanford, Calif., 2002; Jerry R. Hobbs, *On The Coherence and Structure of Discourse*, CSLI Technical Report, CSLI-85-37, 1985). From a Natural Language Processing (NLP) perspective, being able to recover the discourse structure of a text has been motivated by the improvement it affords to discourse processing tasks such as natural language generation (Eduard H. Hovy, *Automated Discourse Generation Using Discourse Structure Relations*, Artificial Intelligence 63, 341-385, 1993) and text summarization (Daniel Marcu, *Improving Summarization Through Rhetorical Parsing Tuning*, Proceedings of The 6th Workshop on Very Large Corpora, 206-215, 1998). In a 2002, paper Schilder describes a simple discourse parsing and analysis algorithm that combines a formal under-specification utilizing discourse grammar with Information Retrieval (IR) techniques. Frank Schilder, *Robust Discourse Parsing via Discourse Markers, Topicality and Position*. Natural Language Engineering, 2002, Vol. 8, Issue 2-3, pages 235-255. The Kehler, Hobbs, Hovy, Marcu and Schilder papers, articles and publications cited hereinabove are incorporated herein by reference in the entirety.

As described at http://www.seas.upenn.edu/~pdtb website, the Penn Discourse Treebank (PDTB) is a large scale corpus annotated with information related to discourse structure and discourse semantics. While there are many aspects of discourse that are crucial to a complete understanding of natural language, the PDTB focuses on encoding discourse relations. The annotation methodology follows a lexically-grounded approach. The PDTB has strived to maintain a theory-neutral approach with respect to the nature of high-level representation of discourse structure, in order to allow the corpus to be usable within different theoretical frameworks. Theory-neutrality is achieved by keeping annotations of discourse relations "low-level": Each discourse relations is annotated independently of other relations, that is, dependencies across relations are not marked.

The PDTB is a project aimed at supporting the extraction of a range of inferences associated with discourse relations, for a wide range of NLP applications, such as parsing, information extraction, question-answering, summarization, machine translation, generation, as well as corpus based studies in linguistics and psycholinguistics. The PDTB project also aims to conduct empirical research with the PDTB corpus, for NLP as well as theoretical linguistics. Discourse relations in the current version of the PDTB are taken to be triggered by explicit phrases or by structural adjacency. Each relation is further annotated for its two abstract object arguments, the sense of the relation, and the attributions associated with the relation and each of its two arguments. The annotations in the PDTB are aligned with the syntactic constituency annotations of the Penn Treebank.

Two documents that describe the PDTB-2.0 corpus and PDTB annotation guidelines, annotation format, and summary distributions are: 1) Rashmi Prasad, Nikhil Dinesh, Alan Lee, Eleni Miltsakaki, Livio Robaldo, Aravind Joshi and Bonnie Webber, *The Penn Discourse Treebank* 2.0, Proceedings of the 6th International Conference on Language Resources and Evaluation (LREC), Marrakech, Morocco; and 2) The PDTB Research Group. 2008, *The PDTB 2.0. Annotation Manual*, Dec. 17, 2007, both available at the http://www.seas.upenn.edu/~pdtb website and incorporated herein by reference in the entirety.

Focusing on the PDTB, the ability to predict rhetorical relations explicitly cued with a discourse marker (45% of the annotated relations in the PDTB) is very straight forward from a machine learning perspective. For example, Emily Pitler, Mridhula Raghupathy, Hena Mehta, Ani Nenkova, Alan Lee and Aravind Joshi, *Easily Identifiable Discourse Relations*, Proceedings of the 22nd international Conference on Computational Linguistics (COLJNG-08), 2008, achieved a 93.09% four-way accuracy based on the explicit marker alone (predicting four rhetorical relation class TEMPORAL, EXPANSION, COMPARISON and CONTINGENCY). The Pitler (2008) paper cited hereinabove is incorporated herein by reference in the entirety.

Consider (1):

Example (1) a. Pascale finished Fox in Sox.
 b. Then she walked to the bookcase to get The Cat in the Hat,
 c. which is her favorite book.
 d. But the book was too high to reach.
 e. So she grabbed Green Eggs and Ham.

In (1), the NARRATION (or TEMPORAL.SYNCHRONOUS.SUCCESSION in the PDTB) relation holds between the actions in (1a-b) as (1b) follows (1a) at event time. The EXPANSION relation, providing more information about Pascale and The Cat in the Hat, holds between (1b-c). (1c) is temporally inclusive (subordinated) with (1b); there is no temporal progression at event time. The CONTRAST relation (1c-d) is temporally inclusive as well and sets an expectation for a RESULT relation which holds between (1d-e), temporally following the event progression in (1a-b).

The correspondence of these relations to the explicit discourse markers—e.g., then (1b), which (1c), but (1d) and so (1e)—is both obvious (i.e., part of the pragmatic system of English) and systematic. However, in the absence of an explicit marker, rhetorical relations must be inferred either from the content of clauses themselves (e.g., what is described and how) or some pragmatic phenomenon (e.g., clause position relative to other clauses, variance in specificity of reference, etc.). To illustrate, consider (2):

Example (2) a. Pascale finished Fox in Sox.
 b. She walked to the bookcase to get The Cat in the Hat,
 c. Her favorite book.
 d. The book was too high to reach.
 e. She grabbed Green Eggs and Ham If markers are missing, the rhetorical structure (progression of relations) between (1) and (2) is arguably similar and open to wider interpretation, but recoverable. In the PDTB, the ability to predict implicit relations (39% of the annotated relations) has proven to be quite difficult compared to their explicit counterparts. For example, (Emily Pirler, Annie Louis and Ani Nenkova. 2009. Automatic Sense Prediction for Implicit Discourse Relations in Texr. In *Proceedings of the Association for Computational Linguistics and the international Joint Conference on Natural Language Processing of the Asian Federation of Natural Ltlnguage Processing* (ACL-IJCNLP-09) 683-691—Pitler (2009)) and (Zhi-Min Zhou and Yu Xu and Zheng-Yu Niu and Man Lan and Jian Su and Chew Lim Tan. 2010. Predicting Discourse Connectives for Implicit Discourse Relation Recognition. In *Proceedings of the 2010 International Conference on Computational Linguistics, Poster Volume*, 1507-1514—Zhou (2010)) achieve between a 36.24 and 40.88 macro-F1 for four rhetorical relation classes based on 10-12 features. This is a significant increase in complexity for mediocre performance. Both Pitler (2009) and Zhou (2010) are incorporated herein by reference in the entirety.

This following is background on discourse structure, the PDTB and the current state of implicit relation prediction. There are several different theories of rhetorical relations and the structure of texts (e.g., Discourse Structure Theory (Grosz and Sidner, 1986), Rhetorical Structure Theory ("RST") (Mann and Thompson, 1987) and Segmented Discourse Representation Theory ("SDRT") (Asher and Lascarides, 2003)). Depending on the theory, there can be a range of theoretically informed predetermined relations (e.g., RST contains roughly 30 relations whereas SDRT contains only about 12). However, any given inventory of rhetorical relations covers the same type of pragmatic phenomenon with varying degrees of specificity and generality. For example, RST contains VOLITIONAL and NON-VOLITIONAL CAUSE relations whereas SDRT only has CAUSE. Previous machine learning tasks related to these theories report a wide range of prediction for all target rhetorical relations combined: 49.70% (6-way classifier) (Daniel Marcu and Abdessarnad Echihabi. 2002. An Unsupervised Approach to Recognizing Discourse Relations. In *Proceedings of the Association of Computational Linguistics* (ACL-02) 2002, 368-375—Marcu (2002)); 57.55% (5-way) (Caroline Sporleder and Alex Lascarides. 2005. Exploiting Linguistic Cues to Classify Rhetorical Relations. In *Proceedings of Recent Advances in Natural Language Processing* (RANLP-05), 532-539-Sporleder (2005)); and 70.707 {, 8 way (sentence internal relations)) (Mirella Lapata and Alex Lascarides. 2004. Inferring Sentence Internal Temporal Relations. In *Proceedings of the North American Association of Computational Linguistics* (NAACL-04) 2004, 153-160—Lapata (2004)) and individual relations—e.g., CONTRAST (43.64%); CONDITION (69%) and ELABORATJON (82%) (Sporleder (2005)). The Grosz et al., Mann et al., Asher et al., Marcu (2002), Sporleder et al., and Lapata et al. papers, articles and publications cited hereinabove are incorporated herein by reference in the entirety.

For purposes of describing the background efforts, "rhetorical relations" may be used interchangeably with "sense" (and indicated with SMALL CAPS) as this is the preferred term in the PDTB. The PDTB draws inspiration from the previously mentioned theories of discourse, but does not adopt a specific framework. Rather, the PDTB centrally relies upon the ability of humans to recognize (and agree to) senses whether indexed explicitly with a discourse marker or not (implicit).

There are over 40 senses assignable in the PDTB which exist in a collapsible hierarchy. At the highest (Class) level, there are 4 senses: TEMPORAL, CONTINGENCY, COMPARISON and EXPANSION. One level down (Type), there are 16 additional senses. At the lowest (Subtype) level, there are 23 additional senses. For sake of space, the full hierarchy is not presented here (see generally, (Prasad et al., 2008)), but the hierarchy is expressed in the sense name as CLASS.TYPE.SUBTYPE. An example PDTB annotation from WSL0790 is in Example (3):

Example (3) a. Explicit, but, COMPARISON, CONTRAST
  As a critique of middle-class mores, the story is heavy-handed but its unsentimental sketches of Cairo life are vintage Mahfouz
  b . . .
  c. Implicit, because, CONTINGENCY.CAUSE.REASON
  The prose is closer to Balzac's "Pere Goriot" than it is to "Arabian Nights" (because) it is Mahfouz began writing when there was no novelistic tradition in Arabic In Example (3), each PDTB annotation, which holds between two spans of text (Arg1, Arg2), indicates whether the relation is Explicit (3a) or Implicit (3c), the actual discourse marker if it is explicit—if it is implicit, the PDTB annotation provides an adjudicated marker that captures the relations because in (3c). Alternative Lexiciliztions (AltLex), No Relations (NoRel) and Entity Relations (EntRel) are also annotated in the PDTB but are not considered in this description as it is assumed that there is always a relation between clauses and that entity relations are part and parcel of the pragmatic determination of the rhetorical relation The sense label to it's appropriate Class, Type or Subtype level, and the related text spans. The Source, Type, Determinacy and Scopal Polarity attributions of the arguments are also given in the PDTB annotation but are not included in the description herein.

As mentioned Section 1.0, Pitler et al. (2008) report results for the four PDTB Class senses and, based solely on the type of explicit marker, achieves a 93.09% four-way accuracy. The fact that there is a highly systematic relationship between discourse markers and the conveyed pragmatic relationship suggests that being able to determine a rhetorical relation in the absence of the marker, i.e. based on the surface content coupled with an individual's ability to draw inferences and make assumptions about discourse structure, is a computationally difficult task.

Pitler et al.'s (2009) system relies on ten different feature sets: (1) Sentiment polarity tags between spans of text (hereinafter "Arg1" and "Arg2"); (2) "Inquirer" tags from the General Inquirer lexicon (Philip J. Stone and Dexter C. Dunphy and Marshall S. Smith and Daniel M. Ogilvie. 1996. The General Inquirer: A Computer Approach to Content Analysis MIT Press, Cambridge, Mass.—Stone et al. (1996)) which provides finer grained distinctions for polarity and some semantic and pragmatic characterizations; (3) Reference to money, percentages or numbers—potentially indicating a comparison; (4) Ranked text unigrarn and bigrams most likely associated with a given relation from the PDTB implicit training set; (5) Ranked text unigram and bigrams most likely associated with a given relation from an explicitly marked training set (TextRels corpus (Sasha Blair-Goldensohn and Kathleen R. McKeown and Owen C. Rambow 2007. Building and Refining Rhetorical-Semantic Relation Models *In Proceedings of NAACL-HLT* (NAACL 2007), 428-435—Blair-Goldensohn et al. (2007)); (6) Verb classifications (Beth Levin 1993. English Verb Classes and Alternations: A Preliminary Investigation. University of Chicago Press. Chicago. Ill.—Levin, (1993)) and their association with different relations; (7) The first and last words of a relations arguments as well as the first three words (following Ben Wellner and James Pustejovsky and Catherine Havasi and Anna Rumshisky and Roser Sauri. 2006. Classification of Discourse Coherence Relations: An Exploratory Study using Multiple Knowledge Sources. In *Proceedings of the 7th SIGdial Workshop on Discourse and Dialogue*, 117-125—Wellner et al. (2006)); (8) The presence or absence of a modal verb, specific modal verbs and their cross-product< >; (9) Whether or not the implicit relation immediately follows or precedes and explicit relation (following Pitler et al. (2008)); and (10) Different variations of word pair models trained on the TextRels, PDTB implicit and explicit training sets—for example, word pairs contributing to the highest information gain for a given relation—the-but, of-but, to-but strongly associate with COMPARISON where the-and, a-and strongly associate with CONTINGENCY. The Stone, Blair-Goldensohn, Levin, and Wellner papers are hereby incorporated herein by reference in the entirety.

All of these features are designed to get at pragmatic information via surface text and associated semantic information. In four binary classification tasks (i.e., COMPARISON or not, etc.), the best feature combination is the use of first and last words as well as the first three words (Native Bayes). The macro-F1 for the four binary classifiers based on this feature is 34.23. Individual relation F1s are: COMPARISON=21.01; CONTINGENCY=36.75; EXPANSION=63.22; TEMPORAL=15.93. By adding different combinations of word-pair relations, performance improved for different relations in the binary classification tasks; raising the macro-F1 6% to 40.56.

Lin et al. (2009) relies on more consolidated features: (1) Contextual features focused on argument embedding between the previous, current and next arguments; (2) Syntactic constituent parses; (3) Dependency parses (using the Stanford parser (de Marneffe et al., 2006)); and (4) Stemmed word pairs from Arg1 and Arg2 in the PDTB. Both the Class and Type level of relations are predicted using these features. The best individual feature performance (OpenNLP MaxEnt) at the Class level is 30.3-32.9% for the word pairs. Combining all features returns 35.0-40.2% accuracy at the Class level. At the Type level, Lin et al.'s system was able to predict 7 of 11 relations. While the prediction of the 7 or 11 Type relations averages to a 40% micro-average, the macro-F1 is between 20.36. Zhou et al. (2010) use a combination of features from Pitler et al. (2009), Lin et al. (2009) and intra-argument word pairs Saito et al. (2006). Zhou et al.'s system makes predictions at the Class level (four linear SVMs from LibSVM (Chih-Chung Chang and Chih-Jen Lin. 2011. LIBSVM: A library for support vector machines. *ACM Transactions on Intelligent Systems and Technology* 2(3), 21:1-27:27—Chang et al. (2011)). Macro-F1 is similar (40.88) is 4% better than Pitler et al.'s best single feature classifier (34.23-36.24) and 2% (42.34) better than Pitler et al.'s best combined system (40.56). The Lin, de Marneffe, Chang, and Zhou papers are hereby incorporated herein by reference in the entirety.

In sum, for predicting implicit in the PDTB, the state of the art research returns macro-F1s that top out at a little more than 40% if different feature and classifier performances are combined and mid-30% for single feature set results. Further, all of the features are based on detecting semantic (and some syntactic) information on the assumption that it systematically co-varies with pragmatic rhetorical relations. Like many tasks attempting to predict the same, sensibly relying on the available text shows small incremental improvement over time, but within a window that, overall, runs counter to being able to actually use discourse structure information in downstream NLP tasks (Lin et al., 2009). The next section presents the methodology for our experiments which duplicate (and in some cases exceed) these results with significantly less (but higher dimensional) features both in terms of amount and processing effort.

SUMMARY OF THE INVENTION

To address the shortcomings of existing systems and to satisfy the present and long felt need of the marketplace, the present invention provides a method and system for simplifying rhetorical relation prediction in large scale annotated corpus or database. More particularly, even if discourse markers are missing, the invention can favorably achieve effective performance for rhetorical relation prediction. In one manner, the rhetorical structure (progression of relations) between Examples (1) and (2) above is arguably similar and open to wider interpretation, but recoverable. Although the invention is described in connection with the PDTB, as it provides a wealth of robustly annotated Wall Street Journal ("WSJ") data and has been the locus of comparative research in this area, the invention is not limited to PDTB. In the PDTB, the ability to predict implicit relations (39% of the annotated relations) has proven to be quite difficult compared to their explicit counterparts. For example, Pitler et al. (2009) and Zhou et al. (2010), achieve between 36.24 and 40.88 macro-F1 for four rhetorical relation classes based on 10-12 features. This is a significant up-tick in complexity for mediocre performance.

Testing shows F-score results that are similar and exceed the current state of the art are actually achievable with a simple set of features—text unigrams and a combined dependency parse. Further, as it pertains to these features for the PDTB and the proposed parameters of the classifier, learning rates suggest that this is as close to the best that can be achieved for this task.

The invention advances a line of research focused on predicting implicit rhetorical relations between two spans of text, for example in the Penn Discourse Treebank ("PDTB"). Rhetorical relations are a pragmatic feature of texts that are cued very strongly by an explicit discourse marker (e.g., but, when). However, determining a rhetorical relation in the absence of an explicit discourse marker has proven to be quite difficult. State of the art prediction relies on a myriad of surface level features designed to capture the pragmatic information encoded in the absent marker. However, overall performance only achieves a macro-F1 between 36 and 40% for all relations combined. The invention has demonstrated that using a simplified feature set based only on raw text and semantic dependencies meets or exceeds previous performance by up to 5% for all relations and up to 14% for certain individual relations. Using surface level features to predict implicit rhetorical relations for the PDTB approaches a theoretical maximum performance, suggesting that more data will not necessarily improve performance based on these and similarly situated features.

In a first embodiment, the invention provides a computer-implemented method for predicting implicit rhetorical relation between spans of text in the absence of an explicit discourse marker, the method represented as instructions stored in memory for recall and processing by a processor such that when executed the method provides a feature vector model comprising a representation of simplified feature set based on raw text and semantic dependencies implemented with a machine learning process, wherein the model comprises one or more inputs and one or more outputs. The method having: identifying by use of a processor executing a set of code a first factor associated with a first relation and associated with a first span of text Arg1 and a second factor associated with a second relation and associated with a second span of text Arg2; and processing one or more of the following features: (1) sequence expressing the first and second relations as a normalized percentage; (2) text unigram, bigram and/or trigrams of Arg1 and Arg2; (3) unigram, bigram and trigram dependencies of Arg1 and Arg2; and (4) the occurrence of one or more of a date, time, location, person, money, percent, organization named entity.

In addition, the first embodiment may be further characterized in having one or more of the following additional features: the sequence of the first relation in a four relation discourse is approximately 0.250; the first and second spans of text Arg1 and Arg2 are part of an annotated corpus; the annotated corpus is one of the group consisting of the Penn Discourse Treebank ("PDTB"); Rhetorical Structure Theory corpus; and the Discourse Graph Bank; the annotated corpus is used to train a system to determine classifications; measuring performance relative to the annotated corpus to determine classifier acceptance; applying an accepted classifier to an un-annotated corpus; the first and second spans of text Arg1 and Arg2 are classified with a rhetorical label stored within the annotated corpus; surface level features are used to capture pragmatic information encoded in the absent discourse marker; the one or more features comprises a simplified feature set based only on one or both of raw text and semantic dependencies; the rhetorical relation is represented in a hierarchy comprising one or more levels including one or more of class level, type level and subtype level; each level comprises a set of senses; the one or more levels includes a class level comprising the following set of senses: temporal, contingency, comparison and expansion; and the one or more levels includes a type level comprising a set of senses different from the class level set of senses.

In a second exemplary embodiment, the invention provides a computer-based system for predicting implicit rhetorical relation between spans of text in the absence of an explicit discourse marker, the system comprising a processor, a memory, a user interface and a display. The system further having: a set of instructions stored in the memory and when executed by the processor adapted to provide a feature vector model comprising a representation of simplified feature set based on raw text and semantic dependencies implemented with a machine learning process, wherein the model comprises one or more inputs and one or more outputs; identifying by use of a processor executing a set of code a first factor associated with a first relation and associated with a first span of text Arg1 and a second factor associated with a second relation and associated with a second span of text Arg2; a rhetorical relation module comprising a set of code when executed by the processor adapted to process one or more of the following features: (1) sequence expressing the first and second relations as a normalized percentage; (2) text unigram, bigram and/or trigrams of Arg1 and Arg2; (3) unigram, bigram and trigram dependencies of Arg1 and Arg2; and (4) the occurrence of one or more of a date, time, location, person, money, percent, organization named entity; and an output adapted generate for display a user interface comprising a representation of the rhetorical relation.

In a third embodiment, the invention provides a computer-implemented method for predicting implicit rhetorical relation between spans of text in the absence of an explicit discourse marker, the method represented as instructions stored in memory for recall and processing by a processor such that when executed the method provides a feature vector model comprising a representation of simplified feature set based on raw text and semantic dependencies implemented with a machine learning process, wherein the model comprises one or more inputs and one or more outputs. In this embodiment the method includes: generating by use of a processor executing a set of code features relevant for classification including by identifying a first feature associated with a first relation and associated with a first span of text Arg1 and a second feature associated with a second relation and associated with a second span of text Arg2; testing multiple machine learning algorithms against a corpus of training data; measuring performance of the tested machine learning algorithms; selecting a preferred machine learning algorithm; and applying the selected preferred machine learning algorithm to a proprietary corpus.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

Figure 1:
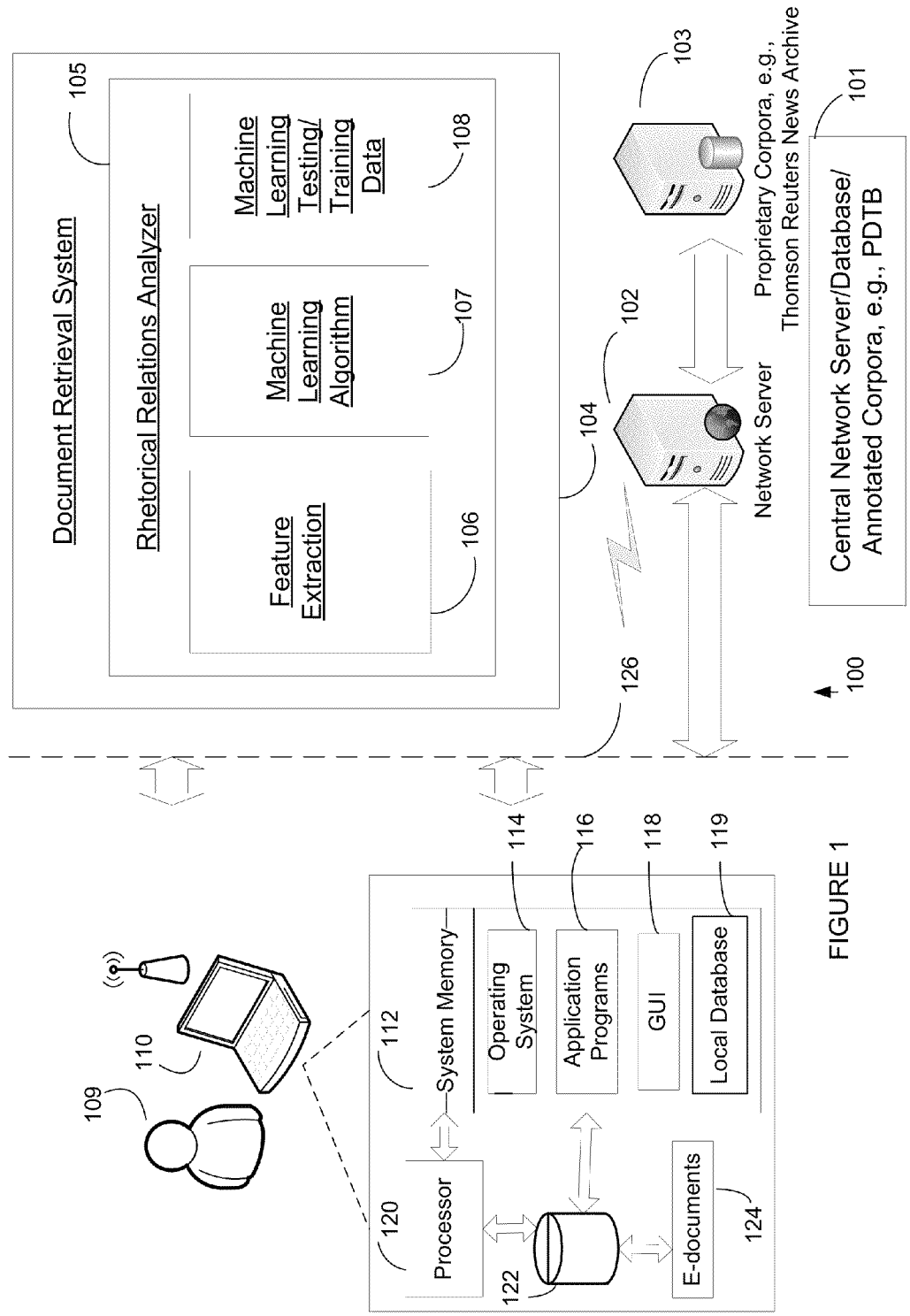
FIG. 1 is a block diagram illustrating one embodiment of the Rhetorical Relation Analyzer/Predictor implemented in a document retrieval system architecture according to the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In accordance with the exemplary embodiments described herein, the present invention provides a method and system for simplifying rhetorical relation prediction in a large scale annotated corpus or database. While much is described in the context of PDTB as the exemplary corpus, the invention is not limited to PDTB and may be used with beneficial effect generally with annotated corpora. For example, other annotated corpora include the Rhetorical Structure Theory corpus and the Discourse Graph Bank. These are both academic corpora similar to the PDTB. Ultimately, in keeping with the invention the annotated corpus is used to train a system to figure out good from bad classifications. In addition, one can measure performance relative to the annotated corpus, i.e., how many did the subject classifier get right, how many did it get wrong. Multiple annotated corpora may be used to arrive at the desired features and classifications. Once classifier performance is acceptable relative to the annotated corpus/corpora, the inventive method may be applied to an un-annotated corpus, such as commercial and proprietary corpora, e.g., the Thomson Reuters News Archive. An additional point to make here is that Arg1 and Arg2 correspond simply to two spans of text. The spans are considered "arguments" and can be sentences or phrases. The PDTB calls them Arg1, Arg2, but more generally, for other annotated corpora and un-annotated corpora, the method will identify two spans of text and attempt to classify them with the appropriate rhetorical label.

More particularly, even if discourse markers are missing, the invention can favorably achieve effective performance for rhetorical relation prediction. In one manner, the rhetorical structure (progression of relations) between Examples (1) and (2) above is arguably similar and open to wider interpretation, but recoverable. Although the invention is described in connection with the PDTB, as it provides a wealth of robustly annotated Wall Street Journal ("WSJ") data and has been the locus of comparative research in this area, the invention is not limited to PDTB. In the PDTB, the ability to predict implicit relations (39% of the annotated relations) has proven to be quite difficult compared to their explicit counterparts.

With reference to FIG. 1, the above processes, and as discussed in more detail below, may be carried out in conjunction with the combination of hardware and software and communications networking illustrated in the form of exemplary system 100. In this example, system 100 provides a framework for searching, retrieving, analyzing, and ranking claims and/or documents. System 100 may be used in conjunction with a system offering of a professional services provider, e.g., West Services Inc., a part of Thomson Reuters Corporation, and in this example includes a Central Network Server/Database Facility 101 comprising a Network Server 102, a Proprietary Corpora Database, e.g., Thomson Reuters News Archive, 103, a Document Retrieval System 104 having as components a Rhetorical Relations Analyzer (RRA) 105, a Feature Extraction module 106, a Machine Learning Module (e.g., SVM), 107 and a Machine Learning Algorithm Testing/Training Data Module 108.

Feature Extraction Module 106 creates features relevant for classification. Machine Learning Module 107 includes algorithms and processes for performing any of one or more machine learning approaches/techniques. Although the exemplary embodiments described herein often refer to support vector machine "SVM" the invention is not limited to this approach. For example, and not by way of limitation, in addition to SVM the Machine Learning Module 107 may use or include Naïve Bayes and Decision Tree classification algorithms as are well known in the art. Machine Learning Testing/Training Data Module 108 allows the user to test the performance of multiple machine learning algorithms/techniques against one or more corpora or training date. The invention creates features that could, in theory, be used with any machine learning algorithm. In one manner, the invention may be used as follows: (1) create features relevant for classification; (2) test multiple machine learning algorithms against training data, e.g., against known annotated corpus such as PDTB; (3) measure and record performance of the tested machine learning algorithms; (4) select the preferred machine learning algorithm; and (5) apply the selected preferred machine learning algorithm to a proprietary corpus, e.g., Thomson Reuters News Archive.

The Central Facility 101 may be accessed by remote users 109, such as via a network 126, e.g., Internet. Aspects of the system 100 may be enabled using any combination of Internet or (World Wide) WEB-based, desktop-based, or application WEB-enabled components. The remote user system 109 in this example includes a GUI interface operated via a computer 110, such as a PC computer or the like, that may comprise a typical combination of hardware and software including, as shown in respect to computer 110, system memory 112, operating system 114, application programs 116, graphical user interface (GUI) 118, processor 120, and storage 122 which may contain electronic information 124 such as electronic documents. The methods and systems of the present invention, described in detail hereafter, may be employed in providing remote users access to a searchable database.

In particular, remote users may search a patent document database using search queries based on patent claims to retrieve and view patent documents of interest. Because the volume of patent documents is quite high, the invention provides scoring and ranking processes that facilitate an efficient and highly effective, and much improved, searching and retrieving operation. Client side application software may be stored on machine-readable medium and comprising instructions executed, for example, by the processor 120 of computer 110, and presentation of web-based interface screens facilitate the interaction between user system 109 and central system 101. The operating system 114 should be suitable for use with the system 101 and browser functionality described herein, for example, Microsoft Windows Vista (business, enterprise and ultimate editions), Windows 7, or Windows XP Professional with appropriate service packs. The system may require the remote user or client machines to be compatible with minimum threshold levels of processing capabilities, e.g., Intel Pentium III, speed, e.g., 500 MHz, minimal memory levels and other parameters.

The configuration thus described in this example is one of many and is not limiting as to the invention. Central system 101 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 101 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 81™, 10G™, or some other suitable database application may be used to manage the data. These tables may be organized into an RDS or Object Relational Data Schema (ORDS), as is known in the art.

Figure 2:
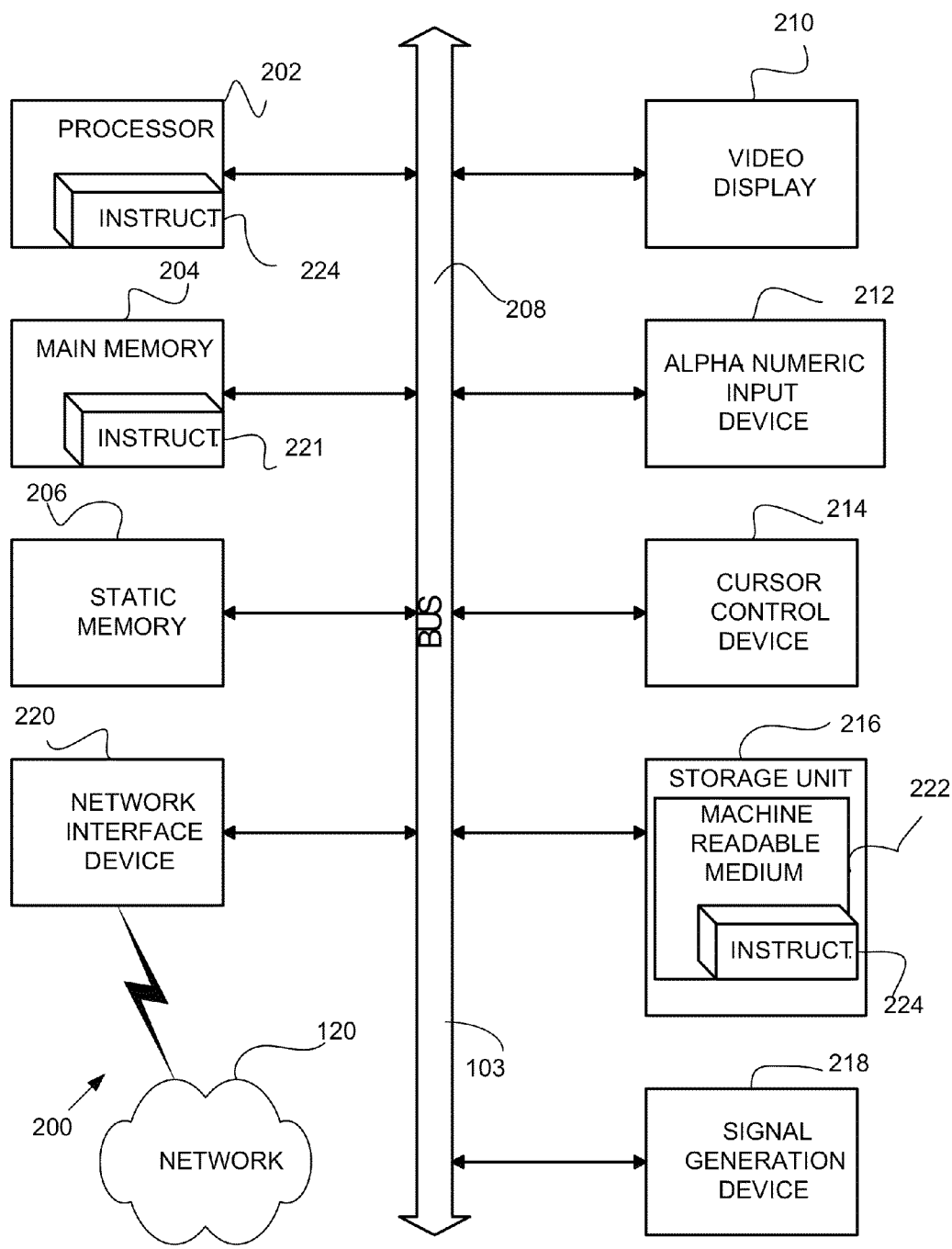
FIG. 2 is a block diagram further illustrating a system architecture for implementing the embodiment of FIG. 1.

Now with reference to FIG. 2, an exemplary representation of a machine in the example form of a computer system 200 within which a set of instructions may be executed to cause the machine to perform any one or more of the methodologies discussed herein. In particular, the system 200, and variations of this, may be used to implement the Document Retrieval System 104 of FIG. 1 and/or components of that system, e.g., Rhetorical Relations Analyzer 105, Feature Extraction Module 106, Machine Learning Algorithm Module 107, and Machine Learning Testing/Training Data Module 108. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may comprise a server computer, a client computer, a personal computer (PC), a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU), or both), a main memory 204 and a static memory 506, which communicate with each other via a bus 508. The computer system 200 may further include a video display unit 210, a keyboard or other input device 212, a cursor control device 214 (e.g., a mouse), a storage unit 216 (e.g., hard-disk drive), a signal generation device 218, and a network interface device 220.

The storage unit 216 includes a machine-readable medium 222 on which is stored one or more sets of instructions (e.g., software 224) embodying any one or more of the methodologies or functions illustrated herein. The software 224 may also reside, completely or at least partially, within the main memory 204 and/or within the processor 202 during execution thereof by the computer system 200, the main memory 204 and the processor 202 also constituting machine-readable media. The software 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

In accordance with the present invention, 31,748 total relations were extracted from the PDTB. Of the total relations extracted, 16831 (53%) were explicit relations, or "explicits," and 14917 (47%) were implicit relations, or "implicits." The distribution of the implicit data is given in Table 1. The data is predominantly "News" text (12368–83%), but other genres are represented as well: "Essays"–1963(13%); "Highlights"–317(2%); "Letters"—259 and (2%); "Errata"–10 (0.06%) (Bonnie Webber. 2009. Genre Distinctions for Discourse in the Penn Tree bank. In *Proceedings for the Conference of the Association of Computational Linguistics*—Webber (2009), hereby incorporated herein by reference in the entirety). In this process, only singly annotated relations were extracted although multiply annotated relations were also present. For example, the minimum number of relations expected for a given discourse of length k is equal to k−1. This is flat, backward looking hierarchy (if forward looking, the total number of relations would be k(k−1)). If non-adjacent clauses are considered, then the maximum number of relations does not exceed the Triangle number T(n); where n=k−1. If a hierarchical structure is considered, the maximum number of relations does not exceed the Catalan number (Schilder, 2002).

TABLE 1

Implicit Relation Distribution

| Class | Distribution | |
|---|---|---|
| EXPANSION | 8034 | (53%) |
| CONTINGENCY | 3936 | (27%) |
| COMPARISON | 2265 | (15%) |
| TEMPORAL | 682 | (5%) |
| Total | 14917 | (100%) |
| Type | | |
| CONTINGENCY.CAUSE | 3935 | (26%) |
| EXPANSION.CONJUNCTION | 3123 | (21%) |
| EXPANSION.RESTATEMENT | 2995 | (20%) |
| COMPARISON.CONTRAST | 1912 | (13%) |
| EXPANSION.INSTANTIATION | 1373 | (9%) |
| TEMPORAL.ASYNCHRONOUS | 592 | (4%) |
| EXPANSION.LIST | 350 | (2%) |

TABLE 1-continued

Implicit Relation Distribution

| | Distribution | |
|---|---|---|
| COMPARISON.CONCESSION | 204 | (1%) |
| EXPANSION.ALTERNATIVE | 176 | (1%) |
| TEMPORAL.SYNCHRONY | 90 | (.01%) |
| CONTINGENCY.PRAGCAUSE | 61 | (.01%) |
| Total | 14811 | (100%) |

For each relation and associated span of text Arg1 and Arg2 developed the following features: (1) sequence—where in the document the relation occurred expressed as a normalized percentage (i.e., the sequence of the first relation in a four relation discourse would be 0.250); (2) text unigram, bigram and trigrams of Arg1 and Arg2; (3) unigram, bigram and trigram dependencies of Arg1 and Arg2 individually and combined using the Stanford Dependency Parser (see de Marneffe et al. (2006) for a full explanation of dependency node types); and (4) the occurrence of a date, time, location, person, money, percent, organization named entity (using the Stanford Named Entity Recognizer ("NER") (Jenny Rose Finkel and Trond Grenager and Christopher Manning 2005. Incorporating Non-local Information into Information Extraction Systems by Gibbs Sampling. In *Proceedings of the 43nd Annual Meeting of the Association for Computational Linguistics (ACL 2005)*, 363-370—Finkel et al. (2005) incorporated herein by reference in the entirety).

For purposes of describing the invention, we examine the following two example feature vectors in the context of exemplary documents "Document 1D: wsj_0692," having Relation: COMPARISON.CONTRAST, and "Document 1D: wsj_1824" having Relation: TEMPORALASYNCHRONOUS.SUCCESSION. For "Document 1D: wsj_0692," the following is known: Arg1 Text: "Anyway ZBB"s procedures were so cumbersome that everyone involved was crushed under a burden of marginalia;" Arg1 NER: NULL; Arg1 Dependency: ADVMOD POSS NSUBJ COP ADVMOD ROOT COMPLM NSUBJPASS PARTMOD AUXPASS CCOMP DET PREP_UNDER PREP_OF; Arg2 Text: A strategic review is fundamentally different; Arg2 NER: NULL; Arg2 Dependency: DET AMOD NSUBJ COP ADVMOD ROOT. In this exemplary document we further use the combined dependency from the two spans of text Arg1 and Arg2: ADVMOD POSS NSUBJ COP ADVMOD ROOT COMPLM NSUBJPASS PARTMOD AUXPASS CCOMP DET PREP . . . UNDER PREP . . . OF DET AMOD NSUBJ COP ADVMOD RCMOD; and Sequence: 0.8

For "Document 1D: wsj_1824" having Relation: TEMPORALASYNCHRONOUS.SUCCESSION, we know the following: Arg1 Text: But the pool of federal emergency-relief funds already is running low because of the heavy costs of cleaning up Hurricane Hugo and Congress will be under pressure to allocate more money quickly; Arg1 NER: ORGANIZATON; Arg 1 Dependency: DET NSUBJ AMOD NN PREP_OF ADVMOD AUX ROOT ADVMOD DET AMOD PREP_BECAUSE_OF PREPC . . . OF PRT NN DOBJ NSUB.i AUX CONLAND PREP . . . UNDER AUX XCOMP AMOD DOBJ ADVMODF. Arg2 Text: In Hugo's wake Congress allocated $1.1 billion in relief funds; Arg2 NER: ORGANIZATION, MONEY; Arg2 Dependency: POSS PREP.JN NSUBJ ROOT DOBJ NUMBER NUMBER NN PREP_IN. In this exemplary document we further use the combined dependency from the two spans of text Arg1 and Arg2: DET NSUBJ AMOD NN PREP . . . OF ADVMOD AUX ROOT ADVMOD DET AMOD PREP_BECAUSE_OF PREPC . . . OF PRT NN DOBJ NSUBJ AUX CONL.AND PREP . . . UNDER AUX XCOMP AMOD DOBJ ADVMOD POSS PREP_IN NSUBJ RCMOD DOBJ NUMBER NUMBER NN PREP_IN; Sequence: 0.16

The Arg1 and Arg2 texts, dependencies and combined dependencies are converted to unigram, bigram and trigram lists (some linearity information (i.e., syntactic) is preserved in the bigram and trigram versions) and are treated as "bags of words." There is not a major difference between Arg1 and Arg2 dependencies and combined dependencies. The most common change is that the ROOT dependency of Arg2 is reassigned as a relative clause modifier (RC_MOD) which provides ever so slightly more information than the individual argument dependencies alone.

With respect to testing, results and comparisons, using two experiments—predicting Class and Type level relations. We report the results using Scikit-Learn's (Pedregosa et al., 2011) LinearSVC (which uses the LIBLINEAR library (Fan et al., 2008)) using tf-idf normalization for each feature set. Similar to Pitler et al. (2009), the system was trained on folders 2-20 and presented test results are based on the hold out test set (21 and 22). Specifically, hyper parameters were found with 10-fold cross-validation. This was done for each combination of features. The hyper-parameters that yielded the lowest cross-validation error in terms of F1 were used to make a model trained on the entire training set to predict the test error via the holdout set.

The results reported in Tables 2 and 3 below for the invention are based on the best combination of features "System Feature Combination," best individual relations "System Feature Subset," and, in the interest of finding the most economical approach, we took the lowest number of features within 0.01 of the top performing system "System Feature Economic" (penalizing more features see e.g. Akaike (1974)). If we take as a goal that the ability to recover discourse structure via rhetorical relations, the focus on the most parsimonious single system output is more appropriate. From an implementation standpoint, running multiple different classifiers to take the best results for any given individual point of classification potentially increases system complexity by a significant margin. However, these results are reported in Tables 2 and 3 for sake of completeness. We compare against Pitler et al. (2009) and Zhou et al. (2010) at the Class level (comparing F1s) and Lin et al. (2009) for the Type level

TABLE 2

Class Level F1 Results Comparison.

| | Comparison | Contingency | Expansion | Temporal | Total |
|---|---|---|---|---|---|
| Pitler et al. (2009) Single Feature | 21.01 | 36.75 | 71.29 | 15.93 | 36.24 |
| Zhou et al. (2010) Single Feature | 31.08 | 47.16 | 68.32 | 16.99 | 40.88 |
| System Feature Combination | 31.35 | 44.29 | 62.98 | 26.76 | 41.34 |
| System Feature Economic | 31.89 | 45.66 | 62.64 | 23.27 | 40.87 |
| Pittler et al. (2009) Feature Subset | 21.96 | 47.13 | 76.42 | 16.76 | 40.56 |
| Zhou et al. (2010) Feature Subset | 31.79 | 47.16 | 70.11 | 20.3 | 42.34 |
| System Feature Subset | 35.95 | 46.45 | 65.02 | 27.35 | 43.69 |

TABLE 3

Type Level Results Comparison (Macro-F1).

| Type | Lin et al. (2009) | System Single | System Best |
|---|---|---|---|
| Temporal.Asynchronous | 13 | 22 | 28 |
| Temporal.Synchrony | 0 | 0 | 0 |
| Contingency.Cause | 51 | 40 | 45 |
| Contingency.PragmaticCause | 0 | 4 | 12 |
| Comparison.Contrast | 15 | 30 | 31 |
| Comparison.Concession | 0 | 2 | 6 |
| Expansion.Conjunction | 38 | 30 | 34 |
| Expansion.Instantiation | 49 | 42 | 47 |
| Expansion.Restatement | 35 | 28 | 29 |
| Expansion.Alternative | 0 | 16 | 23 |
| Expansion.List | 23 | 18 | 23 |
| | 20.36 | 21.49 | 25.27 |

At the Class level, the system of the invention outperforms Pitler et al. (2009) and Zhou et al. (2010) on COMPARISON (+0.27% to +10.34%) and TEMPORAL (+9.77% to +10.83%) relations, but not EXPANSION (−8.31% to −5.33</'o) and CONTINGENCY (−2.86 to +7.53%). Nonetheless, the gains on COMPARISON and TEMPORAL more than make up the difference to achieve top performance on the macro-F1. However, in terms of statistical significance (single-tailed z-test), while our system is significantly better than Pitler et al. (2009) (p=0.0003), we have not been able to demonstrate statistical significance over Zhou et al. (2010) (p=0.3810). The same result trend holds for picking and choosing the best overall single relation performance from all of the possible classifiers.

The best single feature combination by our system (System Feature Combination) was based on (1) unigram and bigram combined dependencies; (2) bigram dependencies; (3) NER; and (4) unigram and bigram texts. Ultimately, this is a very simple set of features—basically different combinations of text and dependencies. If NER is not included, macro-F1 is 41.08 which still outperforms Pitler et al. (2009) and Zhou et al. (2010) and would represent a favorable drop in feature processing complexity. System Feature Economic meets Zhou et al. (2009) using only (1) combined dependency bigrams; (2) individual dependency unigrams; and (3) text unigrams.

At the Type level, our system outperforms that of Lin et al. (2009) by L 13% for macro-F1. Lin et al. (2009) outperforms our system for EXPANSION.CONJUNCTION, EXPANSION.INSTANTIATION, EXPANSION.RESTATEMENT, EXPANSION.UST CONTINGENCY.CAUSE where we form on TEMPORAL.ASYNCHRONOUS, and outper- CONTINGENCY.PRAGMATIC CAUSE, COMPARISON.CONTRAST, COMPARISON.CONCESSION, and EXPANSJON.ALTERNATIVE. This makes sense considering that COMPARISON and TEMPORAL relations performed comparatively better in our system at the Class level. However, we are grabbing 10 of the 11 Type relations compared to their 7 with fewer and simpler features: dependency unigrams, combined dependency bigrams and text unigrams and bigrams.

Now we focus the discussion on the results of the system's economic model, the dimensionality of the features used and the learning rate of predicting Class level senses in the PDTB with combined dependency bigrams, argument dependency unigrams and text unigrams.

With respect to features, we used 10-fold cross-validation (iterating over different combinations of the intercept (I) and regularization (c) hyper parameters) and GridSearchCV in Scikit-Learn to determine optimal features for the SVM. Four values for each hyper-parameter (0.001, 0.01, 0.1, 1) were determined from L2 regularization (post L2 normalization). While we report fewer and simpler features overall as compared to previous research, these features do have a high individual dimensionality: combined dependency bigrams=6390; argument dependency unigrams=490 (Arg1=287, Arg2=203); and text unigrams 22191 (Arg1=10658, Arg2=11533). However, it is not the case that all dimensions in the best performing features are contributing equally. Table 4 indicates the distribution of positively (+) and negatively (−) contributing and non-contributing (0) features.

TABLE 4

Class Level Contributing Feature Distribution.

|   | COMPARISON | CONTINGENCY | EXPANSION | TEMPORAL |
|---|---|---|---|---|
| "+" | 9703 (33%) | 11665 (40%) | 14049 (48%) | 6201 (21%) |
| "−" | 18548 (63%) | 16688 (57%) | 14363 (49%) | 21296 (73%) |
| 0 | 818 (3%) | 716 (2%) | 657 (2%) | 1520 (5%) |

EXPANSION had the most positively contributing features at 48%; followed by CONTINGENCY (40%), COMPARISON (33%) and TEMPORAL (21%). Conversely, TEMPORAL had the highest proportion of features that negatively contributed at 73%; followed COMPARISON (63%), CONTINGENCY (57%) and EXPANSION (49%). For all Class level relations, 2-5% of features did not contribute.

Table 5 indicates that while different Class level features rely on a range of positively contributing features (21-48% of all dimensions), each Class relies on a very similar distribution of those dimensions with, for an individual Class classification, roughly 20cfo relying on combined dependencies (Comb. Dep.). up to 1% for Arg1 and Arg2 dependencies (Dep.), and about 40% on Arg1 and Arg2 Texts—with CONTINGENCY and EXPANSION requiring slightly more from the Arg2 Text rather than Arg1 Text. However, this observed distribution could also be because there are so many more unigrams than dependencies; overall, about half of the dependencies, but less than half of the text unigrams are contributing.

TABLE 5

Class Level Contributing Feature Type Distribution.

|   | COMPARISON | CONTINGENCY | EXPANSION | TEMPORAL |
|---|---|---|---|---|
| Combined Dependency | 1849 (19%) | 2223 (19%) | 2933 (20%) | 1200 (19%) |
| Arg1 Dependency | 72 (1%) | 66 (0.5%) | 104 (0.7%) | 52 (0.8%) |
| Arg2 Dependency | 47 (1%) | 59 (0.5%) | 67 (0.4%) | 49 (0.7%) |
| Arg1 Text | 3903 (40%) | 4406 (37%) | 5207 (37%) | 2495 (40%) |
| Arg2 Text | 3832 (39%) | 4911 (42%) | 5738 (40%) | 2405 (38%) |

In Table 6, which focuses on the top 10 features contributing to each Class level relation, we see that the TEMPORAL and CONTINGENCY relations involve more textual features and only a couple of combined dependencies whereas EXPANSION is a more homogenous mix, but COMPARISON exclusively combined dependencies—in particular, bigrams either starting with an abbreviation modifier (abbrev) or an adjectival complement (acomp). For TEMPORAL, the text unigrams are a combination of stop words (he, was, had, been, in) and temporal adverbs (really, markers) such as when and later. Stop words appear to play an important role in the other relations as well: EXPANSION—from, has, DET (determiner); CONTINGENCY—you. is. these, that, can for; and COMPARISON—AUX, DET, CONJUNCTIVE OR. The role of stop words and the contribution in implicit relation prediction has been observed in Marcu and Echihabi (2002) and Blair-Goldensohn et al. (2007)—in particular, that removing them from the corpus hurts performance. Some text features reveal facts about the corpus, but will have weak generalizeability. For example, market, investors in CONTINGENCY, mr. in TEMPORAL and rose in EXPANSION.

TABLE 6

Class Level Top 10 Contributing Features.

| TEMPORAL | EXPANSION | CONTINGENCY | COMPARISON |
|---|---|---|---|
| TEXT ARG1 he | DEP ARG2 appos | TEXT ARG2 market | CDEP abbrev aux |
| CDEP prep in num | TEXT ARG2 even | TEXT ARG2 you | CDEP abbrev det |
| TEXT ARG1 was | DEP ARG2 prep from | TEXT ARG2 is | CDEP abbrev dobj |
| TEXT ARG2 when | DEP ARG2 num | CDEP advcl nn | CDEP abbrev root |
| TEXT ARG2 had | CDEP num prep from | TEXT ARG1 these | CDEP acomp conj or |
| TEXT ARG2 later | DEP ARG2 number | TEXT ARG2 investors | CDEP acomp dep |
| TEXT ARG1 named | CDEP ccomp number | TEXT ARG1 that | CDEP acomp det |
| TEXT ARG2 been | TEXT ARG2 rose | TEXT ARG2 can | CDEP acomp dobj |
| TEXT ARG2 mr | TEXT ARG1 has | TEXT ARG2 sell | CDEP acomp mark |
| CDEP prt det | CDEP det poss | CDEP nn prep for | CDEP acomp nn |

So, it appears that, consistent with prior research, that there are indeed textual features that systematically co-occur with different Class relations and, for all intense and purposes, "approximates" what a discourse marker would do, especially with pairing up associated coarse-grained semantic information. However, with only 40% or so performance, this approximation is comparatively rather weak. Further, while prior state of the art systems rightfully explore ways to increase the approximation by relying on a multitude of complex features designed to boost the effects of the textual features, we argue in the next section that relying on text level features and logical extensions thereof may continue to yield mediocre results because of what can realistically be learned.

With respect to learning rates, to improve performance, more data could be added to see if prediction accuracy increases; however, prediction accuracy could also suffer. For example, if the explicit data is added to the training set, performance degrades slightly by 1-2 percentage points (observed by Zhou et al. (2010)). While this lower performance could be because the distribution of Class relations is different compared to the implicit data (Expansion—5722 (34%); Temporal—2850 (17%); Comparison—5240 (31%); Contingency—3018 (18%)), based on a comparison of word and dependency distributions between the implicits and explicits, there is little difference in the nature of the underlying data. This suggests on some level that even if more representative implicit data could be found and annotated similar to the PDTB, performance of class level implicit rhetorical relation prediction based on surface features and relevant extensions is simply limited by the theoretical nature of the endeavor.

Figure 3:
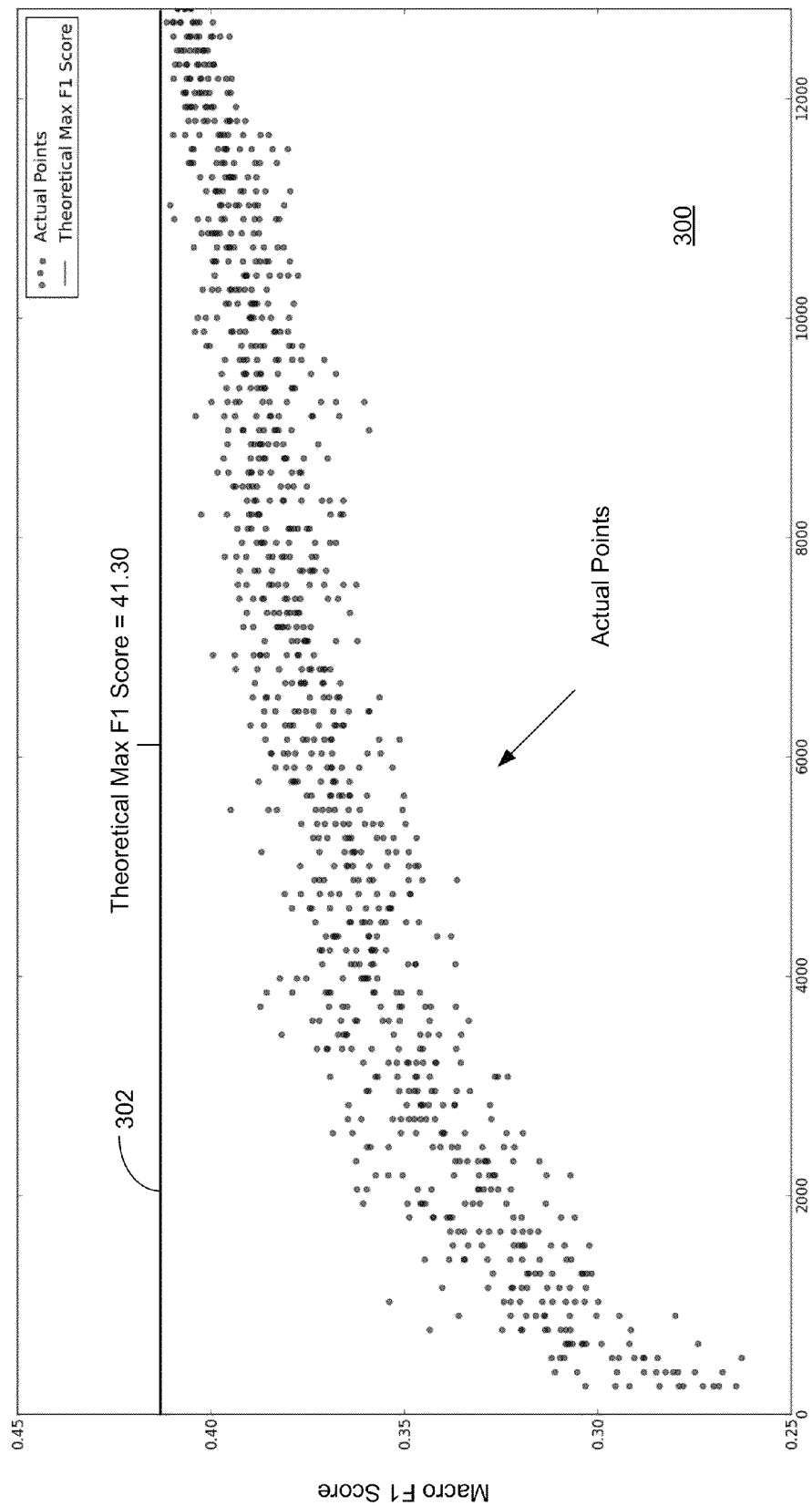
FIG. 3 is a graphical representation of actual points plotted in a macro-F1 score vs. training instance count graph in connection with the present invention.

With reference to FIG. 3, to illustrate consider the graphical representation of Macro F1 Score vs. Training Instance Count of graph 300. To decompose classifier error in an effort to determine if more data would potentially increase performance for the proposed features, classifier and data set, we follow Vapnik (Vladimir Vapnik 1995. The Nature of Statistical Learning Theory. Springer-Verlag New York, Inc., New York, N.Y.—Vapnik (1995)):

$$E = C + \alpha * \sqrt{\left(\frac{VC}{N}\right)}$$

where $\alpha$ is the learning rate. VC is the Vapnik-Chervonenkis dimension of the classifier (Vladimir Vapnik and Alexy Chervonenkis. 1971. On the uniform convergence of relative frequencies of events to their probabilities. Theory of Probability and its Applications, 16(2), 264-280—Vapnik and Chervonenkis (1971)) Both Vapnik references are hereby incorporated herein by reference in the entirety. N is the number of training examples. C is the in-sample error. As N approaches infinity, only C contributes to the error. The is because with an infinite amount of data, everything is in-sample. It also makes sense because if you take the limit as N approaches infinity you're only left with C. Note also that the limit of E as N approaches infinity is C. So if we can calculate C, we know the theoretical error if we had an infinite amount of data (Note that if we get VC wrong, a different a will be learnt, but C will remain the same).

To calculate C, we trained on the holdout set and recorded the error. This gave us a set of (E, N) pairs. We let VC=1 and $$k = \sqrt{\left(\frac{VC}{N}\right)}.$$

For each (E, N) pair, we can get a (E, k) pair, of which E is a linear combination. This allowed us to use ordinary least-squares regression on the set of points (E, k) to find C and $\alpha$ (assuming a normal distribution).

As indicated in graph 300 of FIG. 3, the theoretical limit is shown by bar 302 in this instance as given by (4) is a Macro-F1 of 41.30, indicating the invention is essentially at maximum performance and having more data would not be beneficial using the same or similar features (text unigrams, dependency unigrams and combined dependency bigrams) for the economic system classifier on the PDTB. However, given the nature of the features, it is possible to extrapolate that similar limits to performance will be found for this task on the PDTB.

In sum, the explicit marker is influential in cuing discourse structure in English—it is the best possible information. When it is absent, we may retrieve it from text and by using associated semantics. However, as this research indicates along with an evaluation of in-sample error decomposition, the ability to do this is limited. This reality is in step with underlying theories of pragmatics and discourse structure. For example, there is something odd about having a discourse marker at the beginning of every clause (e.g., potentially violates Grice's manner maxim), so we expect natural language discourses in English to have a fair share of implicit markers, but it's not the case that the understandability of the discourse structure hopelessly breaks down in the absence of a marker. Human inter-annotator agreement "ceiling" for the PDTB for explicit and implicit relations combined is 94% for Class, 84% for Type and 80% for Subtype (Rashmi Prasad, Nikhil Dinesh, Alan Lee, Eleni Miltsakaki. Livio Robaldo. Aravind Joshi and Bonnie Webber. 2008. The Penn Discourse TreeBank 2.0. In *Proceedings of the International Cor~ference on Language Resources and Evaltwtion (LREC-08)*—Prasad et al. (2008)). Therefore, pushing this research forward will require the annotation and surface level association with some type of interpretive assumptions at document level.

The invention improves performance on a simple and easily implementable feature set for implicit rhetorical relation prediction in the PDTB. The feature engineering in accord with the invention was drastically reduced compared to prior systems and did not require any special processing on the corpus other than running of the dependency parser. Computationally, the system of the invention is very efficient in this respect.

In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-implemented method for predicting implicit rhetorical relation between spans of text in the absence of an explicit discourse marker, the method represented as instructions stored in memory for recall and processing by a processor such that when executed the method provides a feature vector model comprising a representation of simplified feature set based on raw text and semantic dependencies implemented with a machine learning process, wherein the model comprises one or more inputs and one or more outputs, the method comprising:
    a. identifying by use of a processor executing a set of code a first factor associated with a first relation and associated with a first span of text Arg1 and a second factor associated with a second relation and associated with a second span of text Arg2; and
    b. processing one or more of the following features: (1) sequence expressing the first and second relations as a normalized percentage; (2) text unigram, bigram and/or trigrams of Arg1 and Arg2; (3) unigram, bigram and trigram dependencies of Arg1 and Arg2; and (4) the occurrence of one or more of a date, time, location, person, money, percent, organization named entity.

2. The computer-implemented method of claim 1, wherein the sequence of the first relation in a four relation discourse is approximately 0.250.

3. The computer-implemented method of claim 1, wherein the first and second spans of text Arg1 and Arg2 are part of an annotated corpus.

4. The computer-implemented method of claim 3, wherein the annotated corpus is one of the group consisting of the Penn Discourse Treebank ("PDTB"); Rhetorical Structure Theory corpus; and the Discourse Graph Bank.

5. The computer-implemented method of claim 3, wherein the annotated corpus is used to train a system to determine classifications.

6. The computer-implemented method of claim 3, further comprising measuring performance relative to the annotated corpus to determine classifier acceptance.

7. The computer-implemented method of claim 6, further comprising applying an accepted classifier to an un-annotated corpus.

8. The computer-implemented method of claim 2, wherein the first and second spans of text Arg1 and Arg2 are classified with a rhetorical label stored within the annotated corpus.

9. The computer-implemented method of claim 1, wherein surface level features are used to capture pragmatic information encoded in the absent discourse marker.

10. The computer-implemented method of claim 1, wherein the one or more features comprises a simplified feature set based only on one or both of raw text and semantic dependencies.

11. The computer-implemented method of claim 1, wherein the rhetorical relation is represented in a hierarchy comprising one or more levels including one or more of class level, type level and subtype level.

12. The computer-implemented method of claim 11, wherein each level comprises a set of senses.

13. The computer-implemented method of claim 11, wherein the one or more levels includes a class level comprising the following set of senses: temporal, contingency, comparison and expansion, and includes a type level comprising a set of senses different from the class level set of senses.

14. The computer-implemented method of claim 1, wherein the machine learning process includes one or more of: support vector machine (SVM), Naïve Bayes, and Decision Tree classification algorithms.

15. A computer-based system for predicting implicit rhetorical relation between spans of text in the absence of an explicit discourse marker, the system comprising a processor, a memory, a user interface and a display, the system further comprising:
   a. a set of instructions stored in the memory and when executed by the processor adapted to provide a feature vector model comprising a representation of simplified feature set based on raw text and semantic dependencies implemented with a machine learning process, wherein the model comprises one or more inputs and one or more outputs;
   b. identifying by use of a processor executing a set of code a first factor associated with a first relation and associated with a first span of text Arg1 and a second factor associated with a second relation and associated with a second span of text Arg2;
   c. a rhetorical relation module comprising a set of code when executed by the processor adapted to process one or more of the following features: (1) sequence expressing the first and second relations as a normalized percentage; (2) text unigram, bigram and/or trigrams of Arg1 and Arg2; (3) unigram, bigram and trigram dependencies of Arg1 and Arg2; and (4) the occurrence of one or more of a date, time, location, person, money, percent, organization named entity; and
   d. an output adapted generate for display a user interface comprising a representation of the rhetorical relation.

16. The computer-based system of claim 15, wherein the first and second spans of text Arg1 and Arg2 are obtained from a corpus of documents.

17. The computer-based system of claim 16, wherein the corpus of documents is annotated.

18. The computer-based system of claim 17, wherein the corpus of documents is one of the group consisting of the Penn Discourse Treebank ("PDTB"); Rhetorical Structure Theory corpus; and the Discourse Graph Bank.

19. The computer-based system of claim 15, wherein surface level features are used to capture pragmatic information encoded in the absent discourse marker.

20. The computer-based system of claim 15, wherein the one or more features comprises a simplified feature set based only on one or both of raw text and semantic dependencies.

21. The computer-based system of claim 15, wherein the rhetorical relation is represented in a hierarchy comprising one or more levels including one or more of class level, type level and subtype level.

22. The computer-based system of claim 21, wherein each level comprises a set of senses.

23. The computer-based system of claim 22, wherein the one or more levels includes a class level comprising the following set of senses: temporal, contingency, comparison and expansion, and a type level comprising a set of senses different from the class level set of senses.

24. The computer-based system of claim 15, wherein the machine learning process includes one or more of support vector machine (SVM), Naïve Bayes, and Decision Tree classification algorithms.

25. A computer-implemented method for predicting implicit rhetorical relation between spans of text in the absence of an explicit discourse marker, the method represented as instructions stored in memory for recall and processing by a processor such that when executed the method provides a feature vector model comprising a representation of simplified feature set based on raw text and semantic dependencies implemented with a machine learning process, wherein the model comprises one or more inputs and one or more outputs, the method comprising:
   a. generating by use of a processor executing a set of code features relevant for classification including by identifying a first feature associated with a first relation and associated with a first span of text Arg1 and a second feature associated with a second relation and associated with a second span of text Arg2;
   b. testing multiple machine learning algorithms against a corpus of training data;
   c. measuring performance of the tested machine learning algorithms;
   d. selecting a preferred machine learning algorithm; and
   e. applying the selected preferred machine learning algorithm to a proprietary corpus.

26. The computer-implemented method of claim 25, wherein the corpus of training data is an annotated corpus.

27. The computer-implemented method of claim 26, wherein the corpus of documents is one of the group consisting of the Penn Discourse Treebank ("PDTB"); Rhetorical Structure Theory corpus; and the Discourse Graph Bank.

28. The computer-implemented method of claim 25, wherein the machine learning process includes one or more of support vector machine (SVM), Naïve Bayes, and Decision Tree classification algorithms.

* * * * *